Patented Jan. 7, 1936

2,027,182

UNITED STATES PATENT OFFICE 2,027,182

HYDROGENATION OF ALIPHATIC ALCOHOLS AND ESTERS

Wilbur A. Lazier, Marshallton, Del., assignor to E. I. du Pont de Nemours & Company, Wilmington, Del., a corporation of Delaware No Drawing. Application February 19, 1931, Serial No. 517,121

5 Claims. (Cl. 260—156)

This invention relates to a process for the production of saturated higher alcohols and their esters. More particularly, it relates to a process for saturating the unsaturated alcohols, esters and other compounds obtained in the high pressure catalytic dehydrogenation of ethyl alcohol to form ethyl acetate. It also relates specifically to a method for converting crotonyl alcohol into butanol.

The patent to F. C. Zeisberg No. 1,708,460 discloses a method wherein ethyl acetate, acetaldehyde and higher alcohols and esters may be formed by passing the vapor of ethanol over dehydrogenating catalysts at elevated temperatures of 250°–500° C. and pressures above 10 atmospheres. In this process, after distillation of the products of the high pressure dehydrogenation reaction, the higher alcohols and esters make up an oily fraction which contains unsaturated bodies such as crotonyl alcohol, crotonyl acetate, ethyl crotonate, and hexenols which impart a sharp disagreeable odor to what would otherwise be a valuable solvent mixture. While the removal of the unsaturation from simple olefines, such as ethylene and the liquid fats by means of catalytic hydrogenation, has been described in the literature, its application to the present problem is without precedent.

This invention has as its principal object the provision of a combined process for the manufacture of ethyl acetate and the higher alcohols and their esters and the treatment of the unsaturated compounds contained therein to render them suitable for solvent purposes. Another object is to obtain saturated alcohols and esters from partially unsaturated alcohols and esters formed in the catalytic dehydrogenation of ethyl alcohol. A further specific object is the production of normal butanol by the hydrogenation of crotonyl alcohol. Other objects will appear hereinafter.

These objects are accomplished by the following invention wherein a primary aliphatic alcohol containing two or more carbon atoms is vaporized and passed over a dehydrogenating catalyst at a high temperature and pressure. The liquid products thus obtained are condensed, separated from the gaseous products and distilled. After distilling off the low boiling esters and unchanged alcohol, there is obtained an oily condensate containing partially unsaturated higher alcohols and esters, the number of carbon atoms of which are for the greater part multiples of the number contained in the original low boiling alcohols subjected to dehydrogenation.

These unsaturated oils are then subjected to hydrogenation in the presence of a hydrogenation catalyst and an excess of hydrogen at a suitable temperature and pressure whereupon saturation of the unsaturated constituents takes place with a resultant improvement in the odor of the product.

As an alternative procedure, the crude higher alcohols and esters may be first subjected to saponification and the acids and alcohols thus obtained refined by subjecting them individually to hydrogenation. In a third alternative procedure, the entire mixture of oily constituents may be acetylated to convert any free alcohols to esters, followed by hydrogenation of the resulting ester mixture.

In the following examples I have set forth several of the preferred embodiments of my invention, but they are intended only for purposes of illustration and not as a limitation.

The first step in carrying out my process, namely, the production of an oily mixture of higher unsaturated alcohols and their esters, follows in general the procedure outlined in the patent referred to above. Two typical examples illustrating this phase of the process are given below.

CONDENSATION STEP (a) Ethanol is pumped into a boiling vessel maintained at a temperature above the critical temperature of the alcohol, for example, 300° C., where it is converted to vapor. This vapor is then conducted to a pressure-resisting tube in which a dehydrogenating catalyst is contained. The catalyst consists of copper oxide to which a few per cent each of manganese oxide and magnesium oxide have been added, reduced carefully before use, and maintained at a temperature of 350° C. The alcohol vapor is passed through this catalyst at a rate equal to four volumes of liquid ethyl alcohol per unit of catalyst per hour.

The effluent gases are passed under pressure through a condensing coil, where there separates unchanged ethyl alcohol in admixture with a liquid reaction product containing a wide variety of substances, among which are acetaldehyde, ethyl acetate, acetone, butanol, crotonyl alcohol, butyl and crotonyl acetates, smaller amounts of higher alcohols and larger amounts of the esters of these higher alcohols with aliphatic acids, such as acetic, butyric, crotonic, caprylic, capric, and higher members of the series. As stated in the Zeisberg patent cited above, there is also present in the reaction product a substantial amount of the aliphatic acids corresponding to the esters noted in the preceding sentence, e. g., acetic acid. There are also present unsaturated compounds other than crotyl compounds capable, on hydrogenation, of producing saturated compounds, such as those indicated above. In addition, there is present a wide range of saturated and unsaturated saponifiable constituents, some of which have not been individually identified.

The uncondensed hydrogen is preferably bled out of the system at such a rate as to maintain the pressure at about 275 atmospheres.

The crude condensate containing the compounds listed above is fractionated into three portions. The first fraction boils under 90° C. and contains the ethanol and ethyl acetate, while the intermediate fraction coming off at about 90–130° C. includes most of the crotyl alcohol, butyl alcohol and the butyl and crotyl acetates. This crude higher alcohol fraction is water-white but possesses a sharp penetrating odor rendering it unsuitable for solvent purposes. Unsaturation is evidenced by an iodine number of 130. The third fraction is a residue boiling at about 130–170° C., which also contains unsaturated compounds.

(b) Ninety-five per cent ethyl alcohol is pumped at the rate of 750 gallons per hour through a heat exchanger and gas fired preheater where the temperature is raised to about 400° C. The hot vapors are distributed by means of a suitable manifold through several cylindrical pressure-resisting catalyst chambers containing in the aggregate 6 cubic feet of catalyst. The catalyst may consist of $\frac{3}{16}$ inch tablets of a chromite composition containing the oxides of zinc, copper and cadmium, prepared according to the directions disclosed in the United States patent to W. A. Lazier No. 1,746,783.

After passing through the contact mass, the vapors are cooled by passage through the heat exchanger and cooling coils, and the liquid products separated from the gaseous products. A pressure of 3,000 pounds per square inch is maintained on the entire reaction system and the liquid and gaseous products are expanded separately to atmospheric pressure.

The condensate passes into continuously operated distillation columns where ethyl alcohol, acetaldehyde and acetone are taken off and the recovered alcohol separated from the water-insoluble alcohols and esters. Two crude higher alcohol fractions are obtained. One contains about 60% ethyl butyrate and 20% butyl acetate and has an iodine number of 20. The other consists largely of butanol containing about 40% butyl acetate and sufficient unsaturated compounds to give an iodine number of 90 to 120. This latter product may be designated "alcoholic oil" to distinguish it from the other product which may be designated "ester oil." The two crude products are obtained in approximately equal amounts and together constitute 3–5% of the crude condensate.

It will of course be obvious that I do not wish to be understood as limiting my process by the exact temperatures and pressures above given in the dehydrogenating step as these may be varied considerably within the scope of my invention. For example, while I prefer to operate at a temperature above 275° C. and a pressure in excess of 10 atmospheres, I may use other higher or lower temperatures and pressures.

Typical examples of the step involving the hydrogenation of the crude synthetic materials obtained by the high pressure dehydrogenation are given below.

HYDROGENATING STEP

Example 1

Two hundred cc. of crude synthetic butanol boiling at 110–130° C. and containing 20% esters calculated as butyl acetate and 0.5% aldehydes as crotonic aldehyde and having an iodine number of 200 was shaken for 4 hours with 0.25 g. platinum oxide under a hydrogen pressure of 30 pounds. The platinum catalyst was prepared by heating platinum chloride in a large excess of sodium nitrate. At the end of the reaction period, the iodine number was 6 and the ester value essentially unchanged. The odor was changed from a sharp, penetrating one characteristic of crotonyl alcohol to the mild odor of butanol.

Example 2

A sample of crude synthetic higher alcohols obtained in the pressure dehydrogenation of ethanol having a boiling range of 150–190° C. and an iodine number of 125 was treated with acetic anhydride after which the excess was removed by washing with water. The acetylated oil was subjected to hydrogenation at 30–40 pounds pressure and 20° C. in the presence of 0.2 g. platinum catalyst. The resulting acetates had an iodine number of 20.

Example 3

A nickel catalyst was prepared by suspending kieselguhr in a nickel nitrate solution and precipitating with ammonium hydroxide. After filtering, washing, and drying, the supported nickel hydroxide was reduced in a current of dry hydrogen for several days at 500° C.

Two hundred cc. of crude synthetic higher alcohol boiling at 100–130° C. and having an iodine number of 78 was placed in a steel tube with 5 g. of the reduced nickel catalyst and was shaken with hydrogen at a pressure of 100 pounds for 3 hours. Hydrogen absorption began at 75° and was quite rapid at 100°. The recovered higher alcohol had an iodine number of 15, a decrease of 81%.

Example 4

Four liters of synthetic unsaturated alcohols boiling between 100° and 125° C. were charged into a 2-gallon cast nickel autoclave together with 50 g. of the reduced nickel catalyst described in Example 3. The charge was stirred at 400 R. P. M. and subjected to 150 pounds hydrogen pressure at a temperature of 100–127° C. After 3 hours the unsaturation of the oil had dropped 66% and the highly colored, evil smelling oil charged into the autoclave had been changed to a pale straw-colored, mild-odored product suitable for use as a solvent.

Example 5

A contact mass consisting of copper chromite was prepared by precipitating a solution of copper nitrate with a solution of neutral ammonium chromate and igniting the dried copper ammonium chromate. Fifty cc. of this material in the form of compressed tablets was placed in a tube and heated to 225° C. The tube was connected with a gas reservoir containing hydrogen at 3000 pounds pressure. Crude synthetic higher alcohols obtained by high pressure dehydrogenation of ethanol as previously described, were pumped over the hot catalyst at the rate of 150 cc. per hour. In this way the oil was hydrogenated continuously with a decrease in iodine number from 153 to 2.2.

*Example 6*

A nickel catalyst of the carbonate type was prepared by suspending 420 pounds of kieselguhr in 500 gallons of nickel nitrate solution containing 5% nickel and slowly precipitating while hot with 1600 gallons of water containing 1400 pounds of hydrated sodium carbonate. The nickel corbonate precipitate was thoroughly washed, dried, and reduced in hydrogen at 450°. In order to protect the freshly reduced mass from oxidation, without exposure to air it was wet with water and stirred to a 40% paste.

Sixty pounds of this catalyst paste was added to 300 gallons of crude "synthetic alcoholic oil" contained in a 500-gallon autoclave. Hydrogen pressure was built up to 300 pounds while the charge was heated with steam and stirred. Hydrogenation began at 70° C. and was complete after 3 hours at a final temperature of 140° C. The iodine number was decreased from 82 to 2 with a very material improvement in the odor of the product.

The hydrogenation will ordinarily be conducted in a liquid phase batch process in the presence of any suitable hydrogenating catalyst. Suitable equipment for this method consists of a steam jacketed autoclave fitted with mechanical stirrer and means for circulating hydrogen. The hydrogenation is continued until hydrogen absorption is complete, the time required being dependent on the activity of the catalyst and the efficiency of mixing. Ordinarily a few hours will suffice.

Unlike the case of hydrogenating fats and vegetable oils, in carrying out the present invention it is very necessary to take into consideration the high vapor pressure of the synthetic alcoholic oils. If the vapor pressure at any given temperature is as large as the total pressure, no hydrogenation can take place, so that the vapor pressure of the oil constitutes the lower limiting pressure. The pressure may be as high as it is practical to provide equipment to withstand. Preferably, the hydrogenation will be carried out at 200–500 pounds. The operative temperature is obviously a function of the catalyst employed. With nickel it will preferably lie between 50° and 150° C.

Instead of using the autoclave and batch process as described above, I may carry out the reaction continuously by pumping the oil together with hydrogen over a suitably supported or granulated hydrogenating catalyst.

In carrying out the hydrogenation step I may use any of the well known hydrogenating metals such as nickel, cobalt, iron, copper, lead, tin, cadmium, zinc, platinum, palladium, silver, etc. Powdered nickel catalysts are preferably prepared by precipitating a chromate, carbonate or hydroxide of the metal followed by reduction with hydrogen, although there is no necessity for limitation to these methods. Granular masses on the other hand may be formed by briquetting a powdered mass or treating it with suitable binders, or by fusing nickel oxide, or oxidizing and reducing massive nickel.

The process of my invention has numerous advantages. It is now possible to economically synthesize higher alcohols from lower ones, thereby providing an unlimited supply of the latter, in most cases at greatly reduced cost. By means of the hydrogenation step, it is possible to saturate the undesirable and valueless unsaturated alcohols to the end that they are rendered valuable for solvent purposes and possess a quality equal to that of the same products obtained from other sources. The particular feature of these unsaturated alcohols which renders them unsuitable for commercial uses is the extremely irritating and penetrating odor characteristic of crotonyl and similar compounds. The improvement in odor effected by the process of this invention has thus been the means of converting an otherwise useless product to one of great value.

As many apparent and widely different embodiments of this invention may be made without departing from the spirit thereof, it is to be understood that I do not limit myself to the foregoing examples or description except as indicated in the following claims.

I claim:

1. In the process of catalytically hydrogenating a mixture of higher saturated and unsaturated alcohols and esters of said alcohols with both saturated and unsaturated acids, which mixture is produced by dehydrogenation and condensation effected by passing the vapor of a primary alcohol of more than one carbon atom over a dehydrogenating catalyst at a temperature of 250° to 500° C. and at a pressure above 10 atmospheres to form the ester corresponding to said primary alcohol, the step which comprises contacting said mixture and hydrogen with a hydrogenating metal catalyst at a temperature of at least 50° C. and under superatmospheric pressure.

2. The process of claim 1 in which the reaction is carried out in the liquid phase.

3. The process of claim 1 in which the reaction is carried out in the presence of excess hydrogen and with vigorous agitation.

4. The process of claim 1 in which the hydrogenation catalyst is a nickel catalyst.

5. The process of claim 1 in which the hydrogenation catalyst is a chromite of a hydrogenating metal.

WILBUR A. LAZIER.